United States Patent [19]
Czerwinski

[11] Patent Number: 6,166,930
[45] Date of Patent: Dec. 26, 2000

[54] REDUCED COMMON VOLTAGE IN A DC MATRIX CONVERTER

[75] Inventor: Christopher S. Czerwinski, Middletown, Conn.

[73] Assignee: Otis Elevator Company, Farmington, Conn.

[21] Appl. No.: 09/310,311

[22] Filed: May 12, 1999

[51] Int. Cl.[7] .................................................. H02M 1/12
[52] U.S. Cl. ............................................. 363/44; 318/811
[58] Field of Search ........................ 363/39, 44; 318/811

[56] References Cited

U.S. PATENT DOCUMENTS 5,982,645 11/1999 Levran et al. ............................. 363/37

OTHER PUBLICATIONS

D.G. Holmes, T. A. Lipo: Implementation of a Controlled Rectifier Using AC–AC Matrix Converter Theory, IEEE Transactions on Power Electronics, vol. 7, No. 1, Jan. 1992, pp. 240–250.

D. Casadei, G. Grandi. G. Serra, A. Tani: Space Vector Control of Matrix Converters With Unity Input Power Factor and Sinusoidal Input/Output Waveforms, EPE '93, Brighton, Sep. 13–16, 1993, pp. 170–175.

L. Huber, D. Borojevic: Space Vector Modulated Three–Phase to Three–Phase Matrix Converter with Input Power Factor Correction, IEEE Transactions on Industry Applications, vol. 31, No. 6, Nov./Dec. 1995, pp. 1234–1246.

*Primary Examiner*—Shawn Riley

[57] ABSTRACT

A DC matrix converter having six forward current conducting power switches and six reverse current conducting power switches has the on time duration of each power switch within each pulse width modulation period controlled by relationships between d, q components of a modulation index determined by the ratio of a voltage command to the instantaneous voltage of the AC mains expressed in stationary d, q coordinates, the selection of which is made based on inequalities between the AC mains voltage components expressed in dq coordinates, and relationships of the AC main voltage components expressed in d, q coordinates. Zero vectors are related to the one AC main having lower line-to-neutral voltage than the other AC mains, using relationships between the instantaneous AC mains voltage in d, q coordinates.

5 Claims, 3 Drawing Sheets

FIG.2
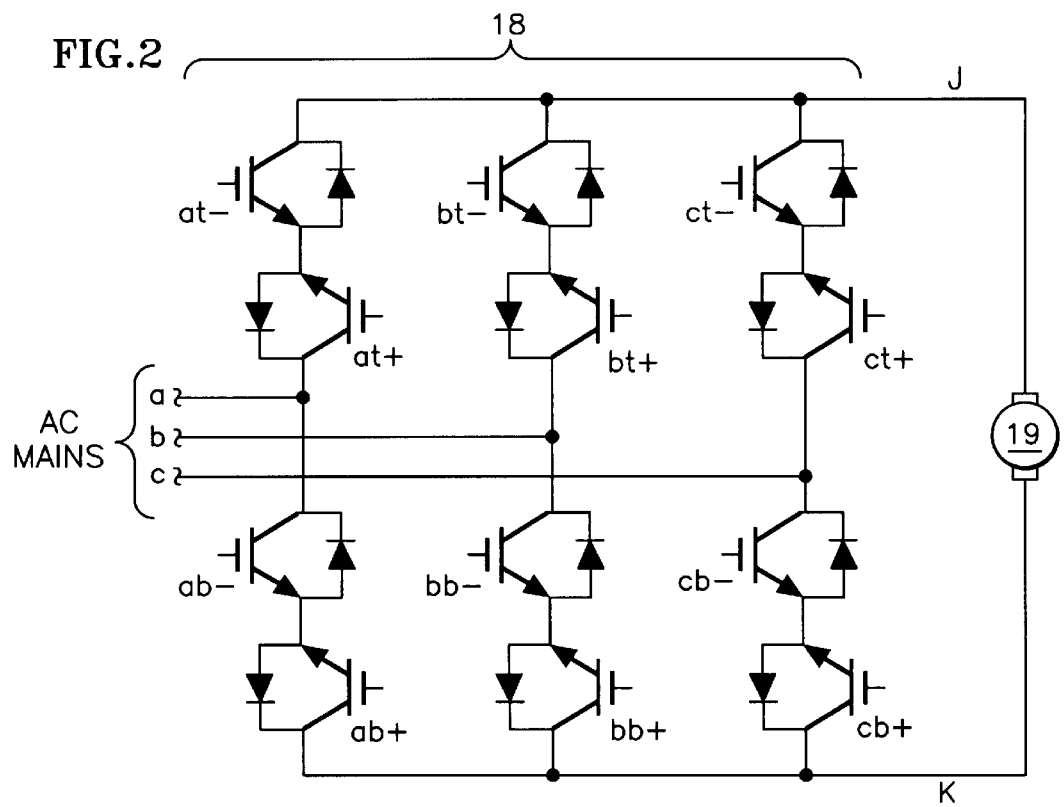
FIG.3
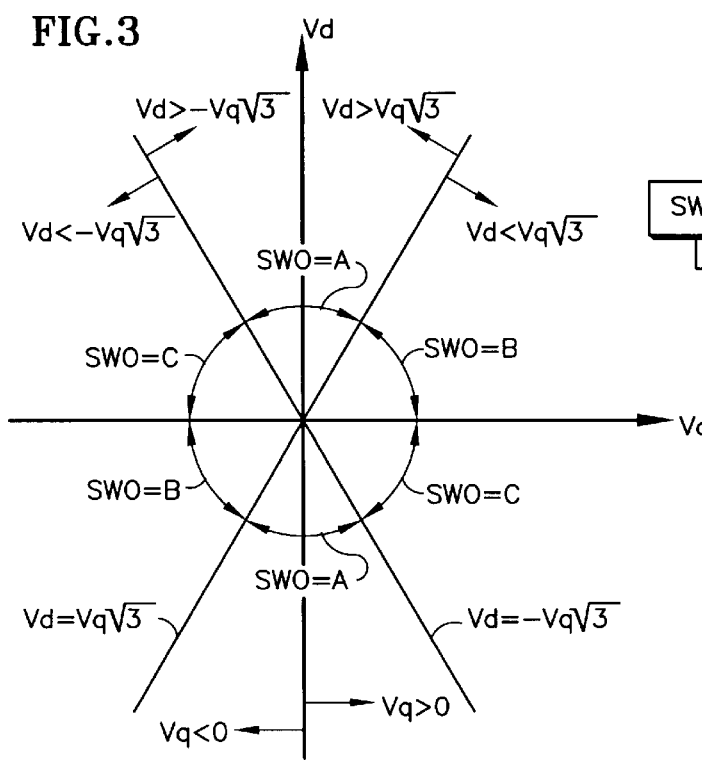
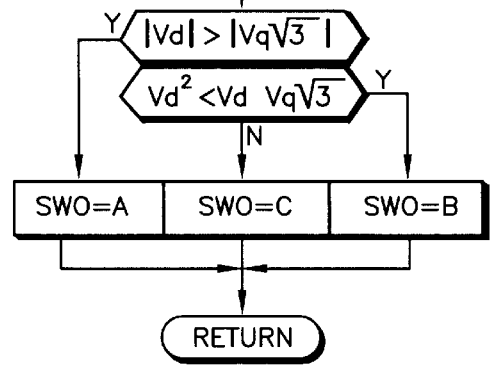
FIG.4

REDUCED COMMON VOLTAGE IN A DC MATRIX CONVERTER

TECHNICAL FIELD

This invention relates to reducing common mode voltage in the output of a direct, AC to DC matrix converter which supplies controlled DC voltage to a load utilizing precisely controlled, pulse width modulation.

BACKGROUND ART

The DC matrix converter is a fully regenerative converter that directly converts three-phase AC voltage to a controlled DC output voltage without a DC bus capacitor bank. The problem lies in the control of the converter and the synthesis of the output voltage. Recent efforts have focused on the minimization of commutation losses in the converter's switching elements to increase converter efficiency. The strategy is to synthesize converter output voltage with a minimum number of commutations, based on an analytical tool commonly referred to as "space-vector" analysis. A recent control strategy for the DC matrix converter based upon this approach is disclosed and claimed in commonly-owned, copending U.S. patent application Ser. No. 09/310, 393 filed contemporaneously herewith.

In the system of said application, the selected switches are turned on and remain on for two out of three portions of the same or adjacent pulse width modulation periods, in a proper sequence, including two voltage-producing portions and one non-voltage producing portion of each pulse width modulation period.

An aspect of the control strategy that has previously been ignored, however, is the impact on the common-mode output voltage, which is the voltage common to all output phases relative to the neutral point in the system. The magnitude of this voltage directly impacts the sizing of common-mode magnetic components that are commonly used in the design of filters for the suppression of electromagnetic interference (EMI). As a consequence, a control strategy that reduces common-mode voltage will directly reduce sizing requirements for such magnetic components.

DISCLOSURE OF INVENTION

Objects of the invention include reducing the common mode output voltage of a DC matrix converter, whereby to reduce the size of magnetic components, such as are used for EMI (electromagnetic interference) suppression.

This invention is predicated on my discovery that the common mode output voltage of a DC matrix, pulse width modulation converter can be reduced by the cosine of $\pi/3$ by restriction of the times, relative to the phase of the AC mains, in which each zero current vector is formed by connecting both DC output terminals to the same selected one of the AC mains.

According to the present invention, in a DC matrix, pulse width modulation converter, zero vectors, defined as when both DC output terminals are connected to the same selected one of the three-phase AC mains, are restricted to corresponding selected portions of each AC cycle in which the line-to-neutral voltage of the corresponding AC main is minimal, thereby to reduce common mode output voltage. For each AC main, these are the portions of its cycle which are within $\pi/6$ of a zero voltage crossing. According further to the invention, the DC output terminals are connected to a first AC main, for which the phase, $\omega t$, at maximum line-to-neutral voltage is defined as zero degrees, during periods when $\pi/3<\omega t<2\pi/3$ and when $4\pi/3<\omega t<5\pi/3$; are connected to a second AC main retarded in phase from said first AC main by $2\pi/3$ when $0<\omega t<\pi/3$ and when $\pi<4\pi/3$; and are connected to a third AC main advanced in phase from said first AC main by $2\pi/3$ when $2\pi/3<\omega t<\pi$ and when $5\pi/3<\omega t<0$.

In a DC matrix converter in which leading and lagging nonzero current vectors are each connected in turn between the AC mains and the DC output terminals for fractions of each of a plurality of successive modulation periods, the zero vectors of the invention may be utilized in each modulation period in any sequence with the non-zero vectors.

The invention reduces the common mode voltage by half of what it may otherwise be.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 2 is a schematic diagram of a common emitter, DC matrix converter which may be controlled in accordance with the present invention.

FIG. 3 is a space-vector diagram illustrating inequalities used to select zero vectors.

FIG. 4 is a simplified, logic flow diagram of an exemplary zero vector switch selection routine.

BEST MODE OF CARRYING OUT THE INVENTION

Figure 1:
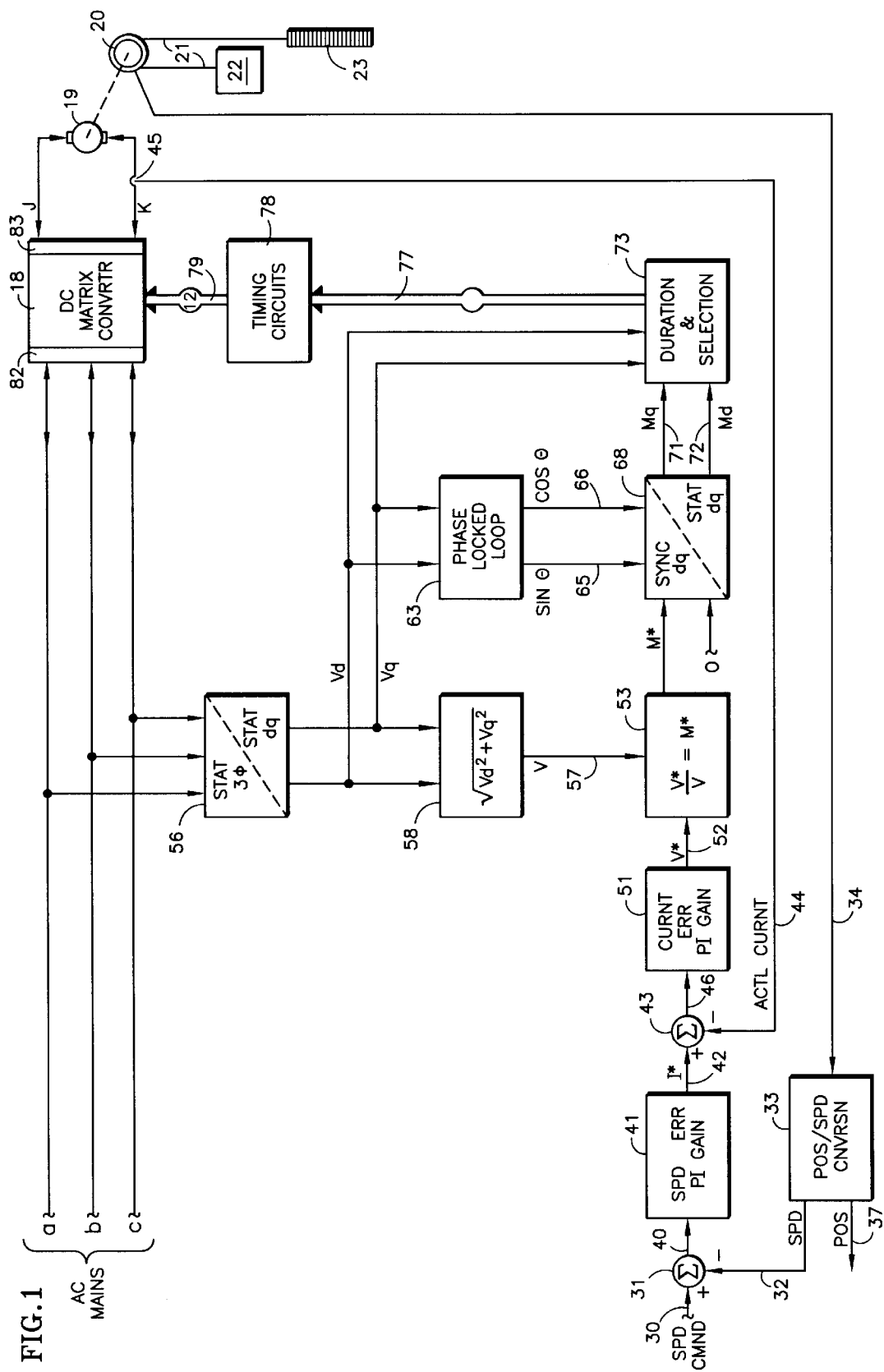
FIG. 1 is a schematic block diagram of an elevator system employing a DC matrix converter controlled in accordance with the present invention.

Referring to FIG. 1, a DC matrix converter 18 provides current to a DC motor 19, which in this embodiment is shown mechanically connected to a sheave 20 which is connected by roping 21 to an elevator car 22 and a counterbalance 23. The DC matrix converter 18 selectively connects various pairs of the three-phase AC mains a, b, c directly to the output terminals of the converter j, k. The voltage can be positive at terminal j and negative at terminal k, and conventional positive current flowing from terminal j to terminal k, such as, for instance, when the elevator is being driven upwardly with a heavy load, or terminal k can be positive, terminal j negative and conventional positive current flowing from k to j, such as, for instance, when the elevator is being driven downwardly with a light load; this is called "motoring". Whenever the elevator is traveling upwardly with a light load, downwardly with a heavy load, or is decelerating, the sheave 20 will actually drive the motor 19 so that the motor 19 acts as a generator. In such a case, the positive current flow through the motor 19 will be of opposite polarity from the polarity of voltage at the terminals j, k; this is called "regeneration". The DC matrix converter 18 will connect the switches appropriately in dependence upon magnitude and direction of a speed command provided to the DC matrix converter controller of FIG. 1, and whether the motor 19 is operating in a motoring mode or in a regeneration mode.

In the example herein, the commands which will ultimately cause the DC matrix converter to drive the motor 19 in a desired fashion are provided by a conventional elevator motion controller (not shown) which provides a speed command on a line 30 to a summer 31 which subtracts the actual speed on the line 32 provided by a conventional position and speed conversion circuit 33 in response to a signal on a line 34 from a suitable, conventional encoder (not shown) which is coupled to the sheave 20 (or the motor 19, as the case may be). A position output of the circuit 33 on a line 37 is fed back to the motion controller so as to determine the continuity of commands necessary to cause the elevator to move in the desired fashion, all as is well known in the art and forms no part of the present invention. The output of the summer 31 is provided on a signal line 40 to a conventional speed error proportional and integral gain circuit 41, the output of which on a line 42 comprises a current command, I*, which is fed to a summer 43. The summer 43 subtracts the actual motor current on a line 44, derived from a conventional current sensor 45 to provide a current error signal on a line 46. The current error signal is processed with conventional proportional and integral gain in a circuit 51, the output of which on a line 52 comprises a voltage command, V*.

The ratio of the magnitude of the voltage command to the magnitude of the input AC mains voltage vector, in stationary dq coordinates, determines a modulation index, m*, which is used to determine the duration of switch-on time during pulse width modulation of the voltage on the AC input mains in order to achieve the desired DC voltage for application to the load, such as the motor 19.

The voltage on the AC mains a, b, c is fed to a conventional stationary three-phase to stationary dq coordinate conversion circuit 56 to provide outputs Vd, Vq which define the three-phase input voltages of the AC mains in orthogonal coordinates, as is known. The magnitude of the AC mains, V, on a line 57, is simply the square root of the sum of the squares of Vd, Vq, performed in a conventional unit 58. The orthogonal magnitudes Vd, Vq are also fed to a conventional phase locked loop 63, the output of which on lines 65 and 66 are signals indicative of sine Θ and cosine Θ, respectively. These are applied to a circuit 68 which converts the modulation index m* in synchronous dq coordinates to desired modulation index components mq, md in stationary dq coordinates. The mq and md signals on lines 71, 72 are fed to a duration and selection function 73 which determines the duration for which a selected pair or set of switches should be turned on, and selects which pair or set of switches are to be on, at any given moment, to perform the necessary pulse width modulation in order to synthesize the desired DC voltage at the output terminals, j, k, of the DC matrix converter 18. The functions 73 are described more fully hereinafter. Signals indicative of the duration of switch on times, and the selected pair of switches to be turned on, are provided over a trunk of lines 77 to timing circuits 78 which actually count pulses in real time so as to implement the desired durations by providing switch on gating circuits over a trunk of 12 lines 79 to the DC matrix converter 18. The timing circuits turn the switches on and off according to conventional commutation methods, so that each of the output terminals is always connected to an AC main, with no open circuit gaps, to satisfy the known continuity of current constraint. One commutation example is set forth in Holmes and Lipo, "Implementation of a Controlled Rectifier Using AC-AC Matrix Converter Theory", IEEE Trans. Power Elec., Jan., 1992.

Although not shown in FIG. 1, the DC matrix converter of the invention requires line-to-line capacitance across the AC input to support switch commutation described hereinafter. These may be included along with in-line inductors within an input filter 82. Similarly, the DC matrix converter preferably has an output filter 83 with series inductance and shunt capacitance, both filters being shown in the aforementioned application.

One embodiment of a DC matrix converter 18 is illustrated in FIG. 2. For each phase of the AC mains, a, b, c there are two power transistor switches at the top of FIG. 2 and two switches at the bottom of FIG. 2. One switch at the top of FIG. 2, at+, bt+, ct+ will conduct current from the corresponding one of the AC mains through the terminal j to the motor 19 while one of the corresponding bottom switches ab+, bb+ cb+ will conduct current from the motor 19, through the terminal k to the corresponding one of the AC mains. For purposes of illustration herein, flow of current from the terminal j, downwardly through the motor 19 to the terminal k is deemed to be positive current flow. For negative current flow, one of the negative bottom switches ab−, bb−, cb− will conduct current from the corresponding one of the AC mains, through the terminal k, through the motor 19, to the terminal j, and one of the top negative switches at−, bt−, ct− will conduct current from the terminal j to a corresponding one of the AC mains.

The operation of the duration and selection function 73 of FIG. 1 so as to control the switch matrix of FIG. 2 is fully described in the aforementioned copending application. Therein, the nomenclature is simplified, using At to refer to either switch at+ or at− of FIG. 2, Bt to refer to either switch bt+ or bt−, and Cb to refer to either switch cb+ or cb−. Which switches, + or −, is determined by desired current flow. The nomenclature includes a leading current vector, Iα, and a lagging current vector, Iβ, each of which can be any of six current vectors i1–i6, each of which comprises operating a selected pair of switches, one top switch and one bottom switch, and a zero current vector, i0, which comprises shorting the matrix output terminals j, k, with a top and bottom switch set connected to the same AC main.

The synthesis of the DC voltage is accomplished by pulse width modulation at a frequency which is very high with respect to the frequency of the AC mains, such as 10 KHz, resulting in a short modulation period, such as 100 μs. Within each 100 μs modulation period, a first current vector is provided by a first pair of switches (such as At, Bb) conducting for some fraction of the modulation period (defined as "duty ratio" and as "duration"), dα, a second current vector is provided by a second pair of switches (such as At, Cb) conducting for some portion of that modulation period, dβ, and a zero vector is formed by a set of switches related to the same phase, such as bt+, bb + conducting for the remaining fraction of time, d0.

A zero vector, i0, is defined as the short circuiting of the output terminals j, k by a set of like-phase switches, At, Ab; Bt, Bb; Ct, Cb. The selection of which set of switches to use in representing the zero vector affects the common- mode output voltage. The application of each vector, i1–i6, results in each of the output terminals, j, k, to be connected to one of the AC main voltages Va, Vb, or Vc. The differential voltage applied across the load, VD, is the difference in the output phase voltages, Vj−Vk, while the common-mode voltage referenced to the system neutral, VCM, is the sum of the two output line voltages divided by the number of output phases, (Vj+Vk)/2. The resulting differential and common-mode voltages produced by each vector is given in the following tables:

| Vector | i1 | i2 | i3 | i4 | i5 | i6 |
|---|---|---|---|---|---|---|
| Switches | At,Cb | Bt,Cb | Bt,Ab | Ct,Ab | Ct,Bb | At,Bb |
| Vj | VC | VC | VA | VA | VB | VB |
| Vk | VA | VB | VB | VC | VC | VA |
| VD | VAC | VBC | VBA | VCA | VCB | VAB |
| VCM | $\frac{VA+VC}{2}$ | $\frac{VB+VC}{2}$ | $\frac{VB+VA}{2}$ | $\frac{VC+VA}{2}$ | $\frac{VC+VB}{2}$ | $\frac{VA+VB}{2}$ |

| | | Vector | i0 | i0 | i0 |
|---|---|---|---|---|---|
| | | Switches | At,Ab | Bt,Bb | Ct,Cb |
| | | Vj | VA | VB | VC |
| | | Vk | VA | VB | VC |
| | | VD | 0 | 0 | 0 |
| | | VCM | VA | VB | VC |

Since the line voltages Va, Vb, and Vc are sinusoidal, the peak common-mode voltage attained by the non-zero vectors, i1 through i6, over an AC cycle is easily calculated as $$VCM(\text{peak}) = \frac{\sqrt{2}\,VLL}{2\sqrt{3}},\ 0 < \omega t \leq 2\pi$$

where VLL is the rms line-to-line voltage and ωt is the AC phase angle in radians. In contrast, the peak common-mode voltage attained by the zero vectors during the same period is $$VCM(\text{peak}) = \frac{\sqrt{2}\,VLL}{\sqrt{3}},\ 0 < \omega t \leq 2\pi$$

As a consequence, an indiscriminant use of the zero vectors results in a peak common-mode voltage which is twice that for the non-zero vectors.

The zero vectors can, however, be chosen in such a way as to reduce the peak common-mode voltage. The zero vector is formed by a set of switches connected to the one of the AC mains having the lowest line-to-neutral voltage, which occurs when the phase of a line is within π/6 of a voltage zero crossing. For example, if the use of the zero vector (At, Ab) is restricted to the periods π/3<ωt21 2π/3 and 4π/3<ωt<5π/3 where ωt=0 corresponds to the peak of the line voltage Va, the maximum common mode voltage is given by:

$$VCM(\text{peak}) = \frac{\sqrt{2}}{\sqrt{3}}VLL\cos(\pi/3),\ \pi/3 < \omega t < 2\pi/3\ \text{or}\ 4\pi/3 < \omega t < 5\pi/3$$

which equals $$VCM(\text{peak}) = \frac{\sqrt{2}}{2\sqrt{3}}VLL,\ \pi/3 < \omega t < 2\pi/3\ \text{or}\ 4\pi/3 < \omega t < 5\pi/3$$

Consequently, the peak common-mode voltage produced by this zero vector has been reduced by half, by restricting its usage during the AC cycle. To realize this reduction factor over the entire AC cycle, similar restrictions are placed on the other zero vectors. This is summarized in the following table and illustrated in FIG. 3.

| Zero Vector | Allowable Periods of Application |
|---|---|
| (At, Ab) | π/3 < wt < 2π/3 and 4π/3 < wt < 5π/3 |
| (Bt, Bb) | 0 < wt − π/3 and π < wt < 4/π/3 |
| (Ct, Cb) | 2π/3 < wt < π and 5π/3 < wt < 0 |

Determination of the switch sets for the zero vector, denoted SW0, applies to both the top and bottom groups of switches in the DC matrix converter. Determination of which sector the voltage vector lies in is accomplished with inequality testing. The inequalities that define the sector boundaries are shown in FIG. 3. The sectors, in which SW0=A, are defined by the following inequality (positive result of test 139 of FIG. 4):

$$[Vd > -Vq\sqrt{3} \cap Vd > Vq\sqrt{3}] \cup [Vd < -Vq\sqrt{3} \cap Vd < Vq\sqrt{3}]$$

$$[Vd > |Vq\sqrt{3}|] \cup [-Vd > |Vq\sqrt{3}|]$$

$$|Vd| > |Vq\sqrt{3}|$$

Similarly, SW0=B is identified by testing the following inequality (positive result of test 140 of FIG. 4);

$$[Vd > 0 \cap Vd < Vq\sqrt{3}] \cup [Vd < 0 \cap Vd > Vq\sqrt{3}]$$

$$[Vd < VdVq\sqrt{3}] \cup [Vd < VdVq\sqrt{3}]$$

$$Vd < VdVq\sqrt{3}$$

SW0=C is determined by elimination (negative result of test 140 of FIG. 4).

Within each modulation period, the order in which the various pairs and sets of switches are operated for the α vector, the β vector, and the zero vector, is immaterial. Thus the order may be a, β, zero; β, α, zero; β, zero, α; or any other order. With the constraint that a switch conducting between one of the AC mains and one of the output terminals is never shut off until another switch is turned on to conduct from an AC main to that terminal, the relationship of switch sets (zero vectors) is such that switch commutation is minimized even for zero vectors by practicing the present invention, when used in a system set forth in said copending application.

Thus, the advantages of reduced requirements of common-mode magnetic components offered by reduced common-mode voltage realized by curtailing the allowable periods of application for the zero vectors may be combined with the reduced commutations offered by the space-vector approach, shown in said copending application. The combined strategy of all allowable vectors, for m* >0, is given in the following table.

| Sector | Vector Iα | Vector Iβ | Angle | Voltage Relationship | Zero Vector |
|---|---|---|---|---|---|
| 0 | i6 | i1 | 330–360 | VA > VC > VB | (C1, C2) |
|   | (A1, B2) | (A1, C2) | 0–30 | VA > VB > VC | (B1, B2) |
| 1 | i1 | i2 | 30–60 |  |  |
|   | (A1, C2) | (B1, C2) | 60–90 | VB > VA > VC | (A1, A2) |
| 2 | i2 | i3 | 90–120 |  |  |
|   | (B1, C2) | (B1, A2) | 120–150 | VB > VC > VA | (C1, C2) |
| 3 | i3 | i4 | 150–180 |  |  |
|   | (B1, A2) | (C1, A2) | 180–210 | VC > VB > VA | (B1, B2) |
| 4 | i4 | i5 | 210–240 |  |  |
|   | (C1, A2) | (C1, B2) | 240–270 | VC > VA > VB | (A1, A2) |
| 5 | i5 | i6 | 270–300 |  |  |
|   | (C1, B2) | (A1, B2) | 300–330 | VA > VC > VB | (C1, C2) |

Figure 5A:
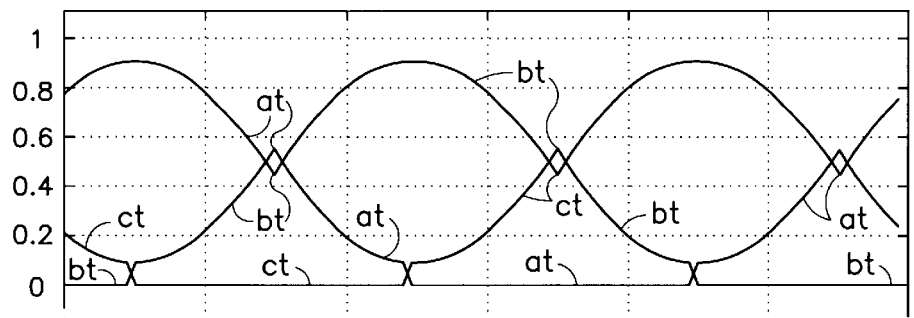
FIG. 5 is a series of waveforms on a common phase base, illustrating principles of the invention.
Figure 5B:
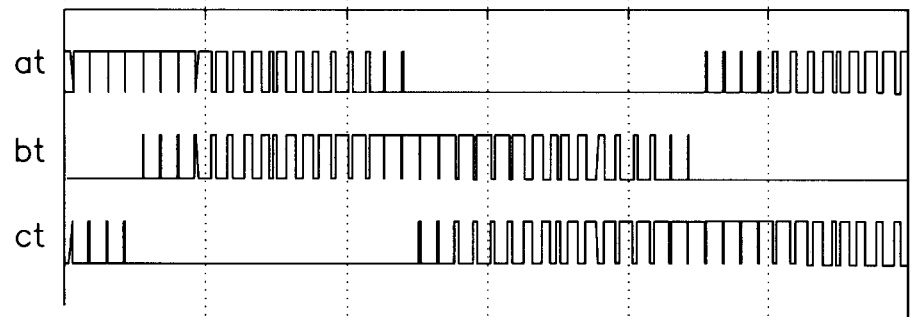
Figure 5C:
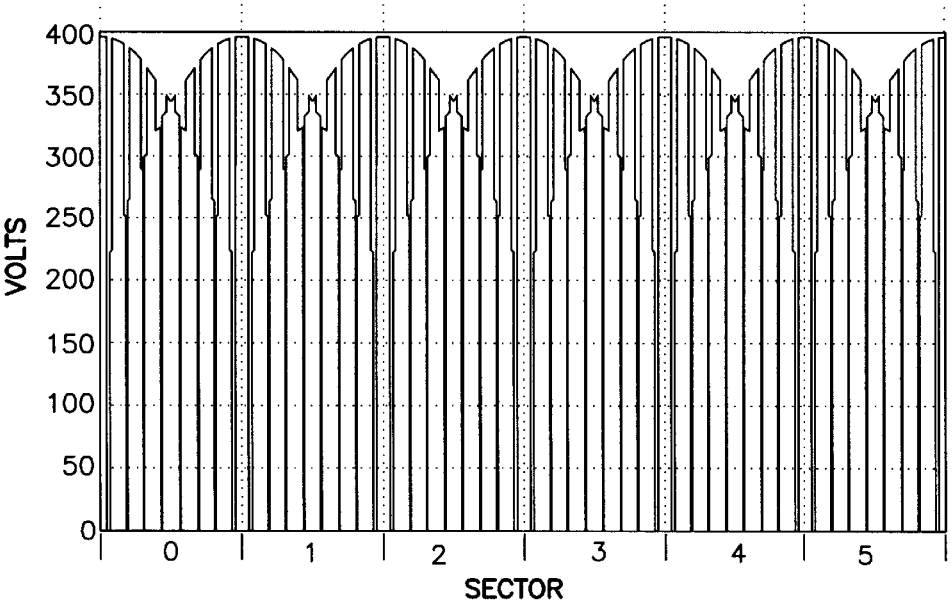

Illustration (a) of FIG. 5 shows the duty for switches at, bt, ct, respectively. Illustration (b) of FIG. 5 shows an exemplary set of on times for switches at, bt, ct, and illustration (c) of FIG. 5 shows the instantaneous (unfiltered, idealized) DC output voltage that would result.

The invention has been described in an embodiment in which there are 12 switches at+ at−, . . . cb+, cb−, in order to accommodate loads in both directions and regeneration. However, the invention may as well be utilized in DC matrix converters driving loads in a single direction and/or without regeneration, such as for driving power tools, or in other applications.

The present invention has been shown as it may be implemented utilizing n-type, punch-through, insulated gate bipolar transistor power switches. However, the invention may be implemented using p-type transistors, or with non-punch-through, insulated gate bipolar transistors connected in anti-parallel pairs.

The foregoing patent application and article are incorporated herein by reference.

I claim:

1. A method of controlling the flow of current through a DC matrix converter between a DC load and a set of three-phase AC mains, said DC matrix converter comprising a plurality of top switches, each connected between a corresponding one of said AC mains and a first DC output of said DC matrix converter, and a plurality of bottom switches, each connected between a corresponding one of said AC mains and a second DC output of said DC matrix converter, comprising:

operating said switches in a manner so that each switch, when operated to connect a corresponding one of said AC mains to a related specific one of said DC outputs, remains operated until another switch has operated to connect one of said AC mains to said specific DC output, and so that one of said top switches is operated contemporaneously with one of said bottom switches, said switches being operated in pairs, each pair including a top switch related to one AC main and a bottom switch related to an AC main other than said one AC main, and said switches also being operated in sets, each set including a top switch and a bottom switch both related to the same AC main;

in each of a continuous sequence of modulation periods which are small compared with the period of voltage of said AC mains, operating a first pair of said switches for a first fraction, dα, of said period, operating a second pair of said switches for a second fraction, dβ, of said period, and operating a set of switches for the remainder of said period; and selecting said set of switches in any modulation period to be a set related to a selected AC main for which the line-to-neutral voltage of said selected AC main is less than the line-to-neutral voltage of the other two of said AC mains.

2. A method according to claim 1 further comprising:

selecting said selected AC main to be one whose instantaneous phase is within π/6 of a zero crossing point of the voltage of said selected AC main.

3. A method according to claim 1 wherein when the present instantaneous phase, ωt, of said AC mains voltage in stationary d, q coordinates is π/3<ωt<2π/3 or 4π/3<ωt<5π/3, where ωt is zero corresponding to the peak of the line voltage of a first one of said AC mains, said selected AC main is said first AC main;

when said instantaneous phase is 0<ωt<π/3 or π<ωt<4π/3, said selected AC main is a second one of said AC mains next delayed in phase from said first AC main; and when said instantaneous phase is 2π/3<ωt<π/3 or 5π/3<ωt<0, said selected AC main is a third one of said AC mains next advanced in phase from said first AC main.

4. A method according to claim 3 further comprising:

providing an in-phase component, Vq, and a quadrature component, Vd, of the current instantaneous AC mains voltage in orthogonal d, q coordinates;

identifying said instantaneous phase to be π/3<ωt<2π/3 or 4π/3<ωt<5π/3 by a first relationship, |Vd|>|Vq√3|;

identifying said instantaneous phase to be 0<ωt<π/3 or π<ωt<4π/3 by a second relationship, Vd²<Vd Vq√3; and identifying said instantaneous phase to be 2π/3<ωt<π/3 or 5π/3<ωt<0 by the absence of both said first relationship and said second relationship.

5. A method of controlling the flow of current through a DC matrix converter between a DC load and a set of three-phase AC mains, said DC matrix converter comprising a plurality of top switches, each connected between a corresponding one of said AC mains and a first DC output of said DC matrix converter, and a plurality of bottom switches, each connected between a corresponding one of said AC mains and a second DC output of said DC matrix converter, comprising:

operating said switches in a manner so that each switch, when operated to connect a corresponding one of said AC mains to a related specific one of said DC outputs, remains operated until another switch has operated to connect one of said AC mains to said specific DC output, and so that one of said top switches is operated contemporaneously with one of said bottom switches, said switches being operated in pairs, each pair including a top switch related to one AC main and a bottom switch related to an AC main other than said one AC main, and said switches also being operated in sets, each set including a top switch and a bottom switch both related to the same AC main;

providing an in phase component, Vq, and a quadrature component, Vd, of the current instantaneous AC mains voltage in orthogonal d, q coordinates;

in each of a continuous sequence of modulation periods which are small compared with the period of voltage of said AC mains, operating a first pair of said switches for a first fraction, dα, of said period, operating a second pair of said switches for a second fraction, dβ, of said period, and operating a set of switches for the remainder of said period;

if $|Vd|>|Vq\sqrt{3}|$, operating the one of said sets connected to a first one of said AC mains which is aligned with the Vq axis;

if $Vd^2<VdVq\sqrt{3}$, operating the one of said sets connected to a second one of said AC mains next delayed in phase from said first AC main; and if neither $|Vd|>|Vq\sqrt{3}|$ nor $Vd^2<VdVq\sqrt{3}$, operating the one of said sets connected to a third one of said AC mains next advanced in phase from said first AC main.

* * * * *